US009143382B2

(12) United States Patent
Bhogal et al.

(10) Patent No.: US 9,143,382 B2
(45) Date of Patent: *Sep. 22, 2015

(54) AUTOMATIC DOWNLOAD OF WEB CONTENT IN RESPONSE TO AN EMBEDDED LINK IN AN ELECTRONIC MAIL MESSAGE

(75) Inventors: Kulvir S. Bhogal, Pflugerville, TX (US); Ishmael Nizamudeen, Jr., Austin, TX (US); Javid Jameossanaie, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 857 days.

This patent is subject to a terminal disclaimer.

(21) Appl. No.: 13/409,969

(22) Filed: Mar. 1, 2012

(65) Prior Publication Data

US 2012/0158836 A1 Jun. 21, 2012

Related U.S. Application Data

(63) Continuation of application No. 09/876,118, filed on Jun. 7, 2001, now Pat. No. 8,195,745.

(51) Int. Cl.
G06F 15/16 (2006.01)
H04L 29/06 (2006.01)
H04L 12/58 (2006.01)
H04L 29/08 (2006.01)

(52) U.S. Cl.
CPC .............. *H04L 29/06* (2013.01); *H04L 51/063* (2013.01); *H04L 51/18* (2013.01); *H04L 67/02* (2013.01)

(58) Field of Classification Search
None
See application file for complete search history.

(56) References Cited

U.S. PATENT DOCUMENTS

| 5,903,723 | A | 5/1999 | Beck et al. |
| 6,009,462 | A | 12/1999 | Birrell et al. |
| 6,044,395 | A | 3/2000 | Costales et al. |
| 6,769,015 | B1 | 7/2004 | Bates et al. |
| 2002/0138586 | A1 | 9/2002 | Paleiov et al. |

OTHER PUBLICATIONS

Ducheneaut, Nicolas et al. "E-mail as Habitat: An Exploration of Embedded Personal Information Management." Interactions, vol. 8, Issue 5. ACM, Sep. 2001. pp. 30-38.*
Schulzrinne, Henning. "World Wide Web: Whence, Whither, What Next?" IEEE Network, vol. 10, issue 2, pp. 10-17. Mar./Apr. 1996. IEEE.*
"U.S. Appl. No. 09/876,118 Final Office Action", Jun. 2, 2005 , 7 pages.
"U.S. Appl. No. 09/876,118 Office Action", Oct. 6, 2004 , 6 pages.

* cited by examiner

*Primary Examiner* — Jeffrey R Swearingen
(74) *Attorney, Agent, or Firm* — DeLizio Law, PLLC

(57) ABSTRACT

A method in a distributed computer system includes a server and a client and is for delivering Web content within a body section of electronic mail messages. The method includes receiving at a server, at least one mail message containing an embedded hyperlink. The method includes downloading Web content associated with the hyperlink into the message store at the server. The method also includes transmitting the mail message and at least one of a link to the Web content downloaded into the message store at the server and the corresponding Web content for display at the client. The method includes determining whether the client has a preset time for downloading messages containing Web content. In response to determining that a preset time for downloading Web content exists, the method includes caching the message and Web content at the server until the preset time is reached.

20 Claims, 4 Drawing Sheets

AUTOMATIC DOWNLOAD OF WEB CONTENT IN RESPONSE TO AN EMBEDDED LINK IN AN ELECTRONIC MAIL MESSAGE

RELATED APPLICATIONS

This application claims the priority benefit of U.S. application Ser. No. 09/876,118 filed Jun. 7, 2001, that is now issued as U.S. Pat. No. 8,195,745.

BACKGROUND

Embodiments of the invention(s) generally relate to the field of communications, and, more particularly, to downloading of web content in response to an embedded link in an electronic message.

Electronic mail (e-mail) is one of the most commonly used applications for distributed computer networks. The benefits of e-mail applications are obvious. Users can quickly communicate with one another. If a person is unable to pick up a message immediately, the message is stored until that person can review the stored message at a later time. E-mail messages also provide a quick and easy way to package information such as sales reports, graphics, and other data for transfer to another user by simply attaching the information to the message. Business users increasingly rely on e-mail messages to share ideas, transmit documents, schedule meetings, and transmit links to large amounts of information stored on a remote server.

The World Wide Web is the Internet's multimedia information retrieval system. In the Web environment, client machines effect transactions to Web servers using the Hypertext Transfer Protocol (HTTP), which is a known application protocol providing users access to files (e.g., text, graphics, images, sound, video, etc.) using a standard page description language known as Hypertext Markup Language (HTML). HTML provides basic document formatting and allows the developer to specify "links" to other servers and files. In the Internet paradigm, a network path to a server is identified by a so-called Uniform Resource Locator (URL) having a special syntax for defining a network connection. Use of an HTML-compatible browser (e.g., Netscape Navigator or Microsoft Internet Explorer) at a client machine involves specification of a link via the URL.

As is often the case, users place a link to a URL of interest within an e-mail message that they want the recipient to view. The recipient opens the message and either selects the link or copies the link into their browser and waits for the HTML page associated with the URL to be downloaded. In order to download the information, users must first wait while the browser software opens, contacts the Web server indicated in the URL, then downloads the corresponding HTML page to the user's computer. Depending upon the type of connection and the size of the Web content being downloaded, the downloading step could take several minutes. A method for downloading the messages with the Web content already present in the body of the message would be very helpful.

SUMMARY

Some example embodiments include a method in a distributed computer system including a server and a client, wherein the server includes a message store. The method is for delivering Web content within a body section of electronic mail messages. The method includes receiving at a server, at least one mail message containing an embedded hyperlink. The method includes downloading Web content associated with the hyperlink into the message store at the server. The method also includes transmitting the mail message and at least one of a link to the Web content downloaded into the message store at the server and the corresponding Web content for display at the client. The method includes determining whether the client has a preset time for downloading messages containing Web content. In response to determining that a preset time for downloading Web content exists, the method includes caching the message and Web content at the server until the preset time is reached.

BRIEF DESCRIPTION OF THE DRAWINGS

The present invention will be better understood and its numerous objects and advantages will become more apparent to those skilled in the art by reference to the following drawings, in conjunction with the accompanying specification, in which.

DESCRIPTION OF EMBODIMENT(S)

Figure 1:
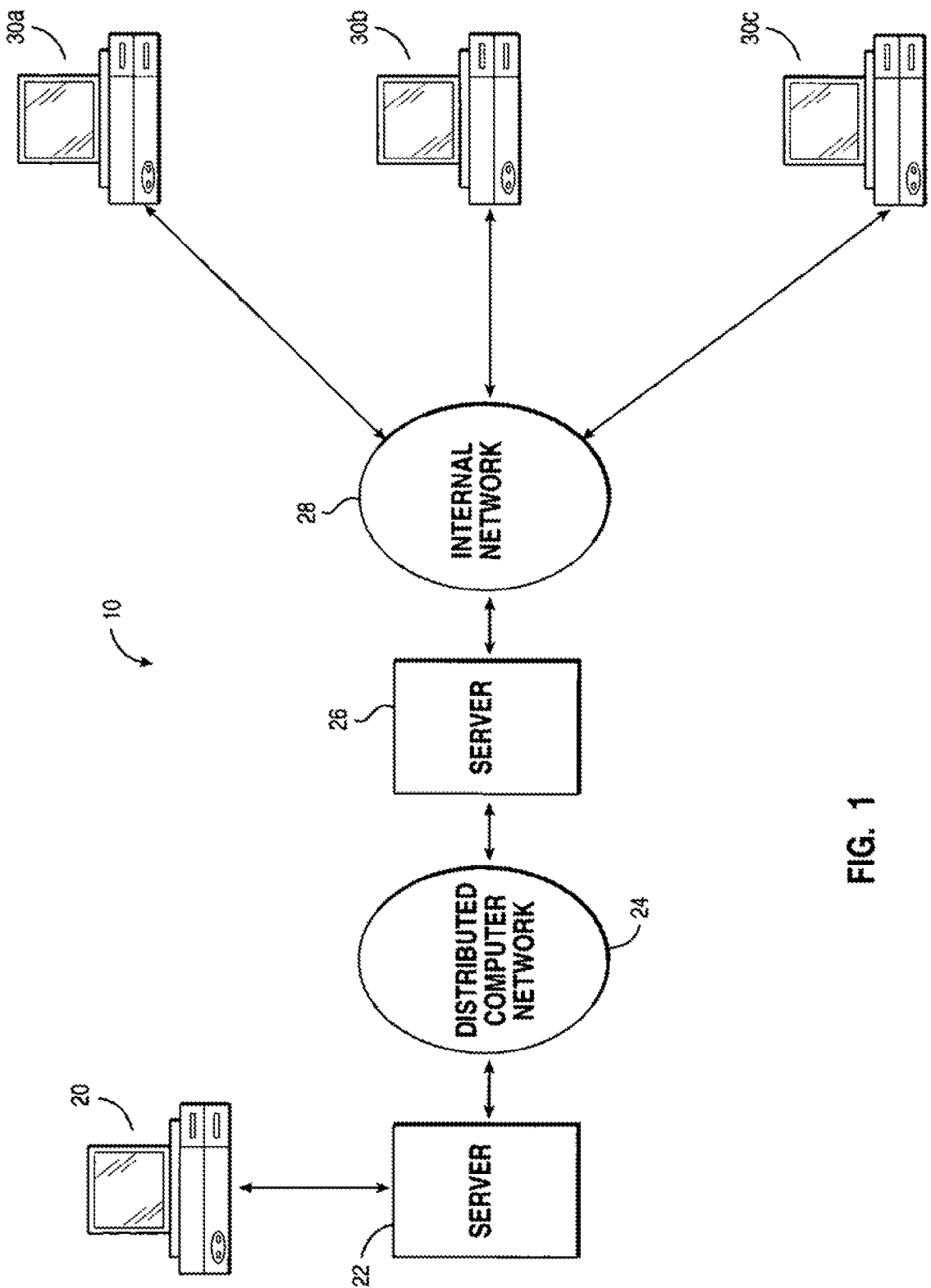
FIG. 1 is a generalized network setup in which the present invention may be carried out.

The present invention relates to a system and method for downloading Web content related to embedded links placed in e-mail messages and transmitting the content to a client from a mail server without waiting for the client browser program to download the Web content associated with the link.

Exemplary Operating Environment

The following discussion is intended to provide a general description of a suitable computing, environment in which the invention may be implemented. While the invention will be described in the general context of an application program that runs on an operating system in conjunction with a personal computer and in connection with a server, those skilled in the art will recognize that the invention also may be implemented in combination with other program modules. Generally, program modules include routines, operating systems, application programs, components, data structures, etc. that perform particular tasks or implement particular abstract data types. Moreover, those skilled in the art will appreciate that the invention may be practiced with other computer system configurations, including hand held devices, multiprocessor systems, microprocessor-based or programmable consumer electronics, minicomputers, mainframe computers, and the like.

The invention may also be practiced in distributed computing environments where tasks are performed by remote processing devices that are linked through a communications network. In a distributed computing environment, program modules may be located in both local and remote memory storage devices. Execution of the program modules may occur locally in a stand-alone manner or remotely in a client/server manner. Examples of such distributed computing environments include local area networks of an office, enterprise-wide computer networks, and the Internet.

The Internet is a global web of interconnected computers and computer networks that integrates local area networks (LANS) located in various entities, such as businesses, libraries, federal agencies, institutes of learning, and research organizations into a single communication network. The Internet uses a common communication protocol suite, known as a Transmission Control Protocol/Internet Protocol (TCP/IP), designed for the interconnection of different computer systems. Internal and external networks are linked by routers that route data packets from a sending network to another router or a receiving network. Gateways handle data transfer and conversion of messages from a sending network to the protocols used by a receiving network. Typically, gateways refer to devices that translate between applications. For example, e-mail gateways translate messages from one vendor's messaging program to another vendor's messaging program so that users with different e-mail programs can share messages over a network.

The Internet uses a message standard, known as a Simple Mail Transfer Protocol (SMTP), which works in conjunction with a user's e-mail program and defines the control messages used by two computers to exchange e-mail messages. Such controls include verification of proper connection, identification of sender, negotiation of transmission parameters, and message transmission. SMTP is responsible for 1) sending mail created by a local user to another computer and 2) receiving mail from other computers on the network and transferring it to the local user's e-mail program.

Typically, the computers connected to a wide area network such as the Internet are identified as either servers or clients. A server is a computer that stores files that are available to the other computers connected to the network. For example, an e-mail server manages message traffic and mail boxes for users, in addition to translation facilities or gateways that allow message exchange between different types of e-mail programs. A client is a computer connected to the network that accesses shared resources provided by a server. To obtain information from a server, a client makes a request for a file or information located on the server using a specified protocol. Upon reception of a properly formatted request, the server downloads the file or information to a local message store located at the client.

FIG. 1 illustrates a typical client-server environment 10 in which the present invention operates. A computer system or client 20, such as a conventional personal computer or any device operable to communicate over a network, is connected to an Internet server computer 22 ("server"). The server 22 is generally provided by an Internet service provider (ISP), which provides Internet access. The server 22 is connected to a distributed computer network 24, such as the Internet, and enables the client 20 to communicate via the distributed computer network 24.

The client 20 communicates via the combination of the server 22 and the distributed computer network 24 to a server 26, such as a communication or an e-mail server. In an exemplary embodiment, servers 22 and 26 support e-mail services, contain a message store for holding messages and Web content until delivery, and contain a translation facility or gateway for allowing users having different e-mail programs to exchange mail. The message store may contain a database for storing the Web content associated with hyperlinks embedded in a given e-mail message. The server 26 is connected to an internal network 28 and enables the client 20 to communicate with the clients 30a, 30b, and 30c via the internal network 28.

The clients 30a, 30b, and 30c are able to respond to a communication from the client 20, and are able to initiate communication with the client 20. The clients 30a, 30b, and 30c can send information via the internal network 28 to the server 26. The server 26, in turn, forwards the information to the client 20 via the distributed computer network 24. The information is retrieved by the server 22 and can be forwarded to the client 20, when requested by the client 20.

Figure 2:
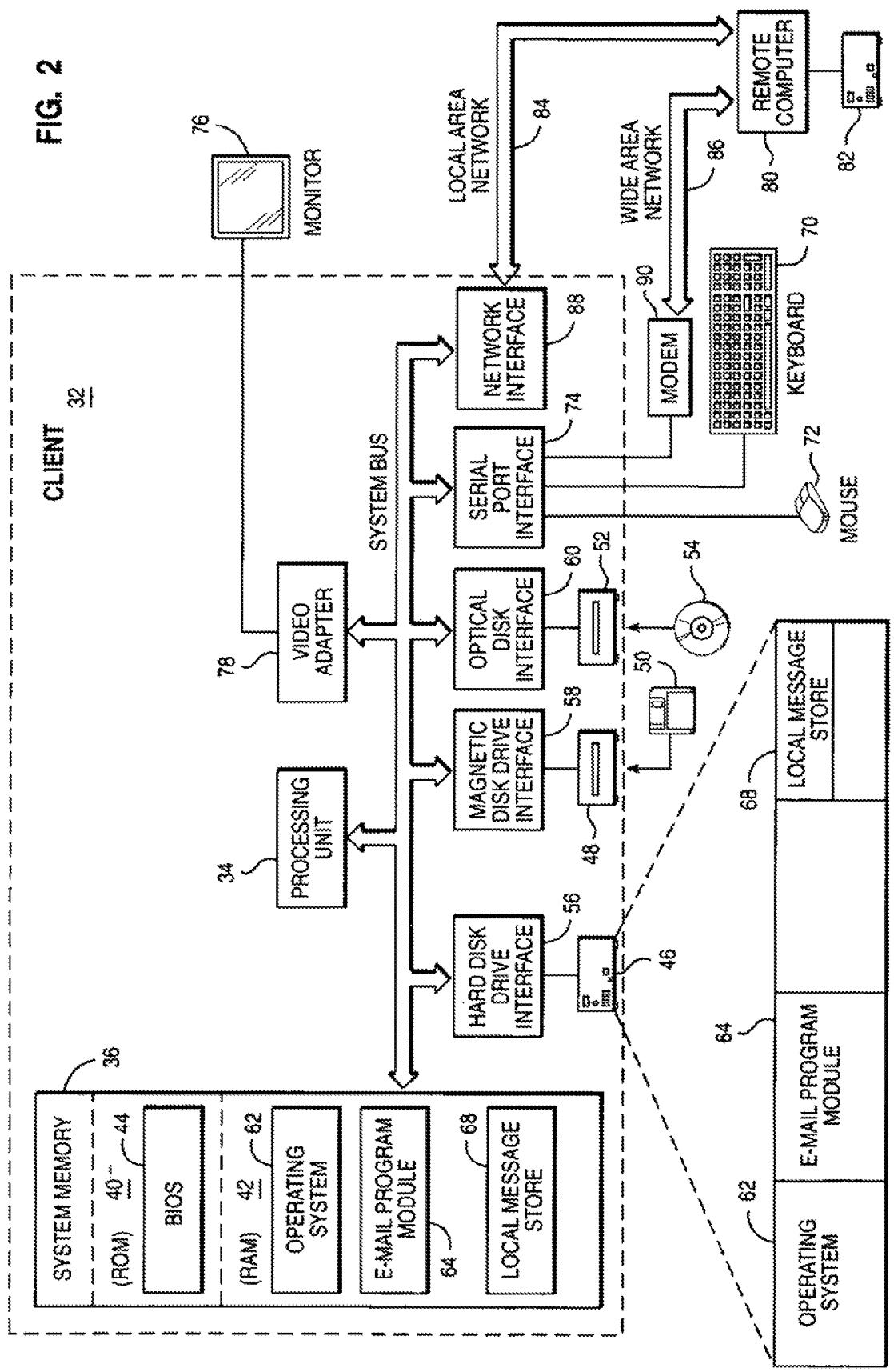
FIG. 2 is a block diagram of an exemplary system for implementing the invention.

With reference to FIG. 2, an exemplary system for implementing the invention includes a conventional personal computer 32, which serves as a client. The client 32 may represent any or all of the clients 30a, 30b, and 30c illustrated in FIG. 1. The client 32 includes a processing unit 34, a system memory 36, and a system bus 38 that couples the system memory to the processing unit 34. The system memory 36 includes read only memory (ROM) 40 and random access memory (RAM) 42. A basic input/output system 44 (BIOS), containing the basic routines that help to transfer information between elements within the client 32, such as during, start-up, is stored in ROM 40. The client 32 further includes a hard disk drive 46, a magnetic disk drive 48, e.g., to read from or write to a removable disk 50, and an optical disk drive 52, e.g., for reading a CD-ROM disk 54 or to read from or write to other optical media. The hard disk drive 46, magnetic disk drive 48, and optical disk drive 52 are connected to the system bus 38 by a hard disk drive interface 56, a magnetic disk drive interface 58, and an optical drive interface 60, respectively. The drives and their associated computer-readable media provide non-volatile storage for the client 32. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, and the like, may also be used in the exemplary operating environment.

A number of program modules may be stored in the drives and RAM 42, including an operating system 62, one or more application programs, such as an e-mail program module 64, other program modules, such as a local message store 68. A user may enter commands and information into the client 32 through a keyboard 70 and pointing device, such as a mouse 72. Other input devices (not shown) may include a pen, touch-operated device, microphone, joystick, game pad, satellite dish, scanner, or the like. These and other input devices are often connected to the processing unit 34 through a serial port interface 74 that is coupled to the system bus, but may be connected by other interfaces, such as a game port or a universal serial bus (USB). A monitor 76 or other type of display device is also connected to the system bus 38 via an interface, such as a video adapter 78. In addition to the monitor, personal computers typically include other peripheral output devices (not shown), such as speakers or printers.

The client 32 operates typically in a networked environment using logical connections to one or more remote computers, such as a remote computer 80. The remote computer 80 may be an e-mail server which includes one or more message stores, as described above in connection with FIG. 1, a file server which includes one or more file stores, a router, a peer device or other common network node, and typically includes many or all of the elements described relative to the client 32, although only a memory storage device 82 has been illustrated in FIG. 2. The logical connections depicted in FIG. 2 include a local area network (LAN) 84 and a wide area network (WAN) 86. Such networking environments are commonplace in offices, enterprise-wide computer networks, intranets and the Internet.

When used in a LAN networking environment the client 32 is connected to the LAN 84 through a network interface 88. When used in a WAN networking environment, the client 32 typically includes a modem 90 or other means for establishing communications over the WAN 86, such as the Internet.

The modem 90, which may be internal or external, is connected to the system bus 38 via the serial port interface 74. In a networked environment, program modules depicted relative to the client 32, or portions thereof, may be stored in the remote memory storage device. It will be appreciated that the network connections shown are exemplary and other means of establishing a communications link between the computers may be used.

Figure 3:
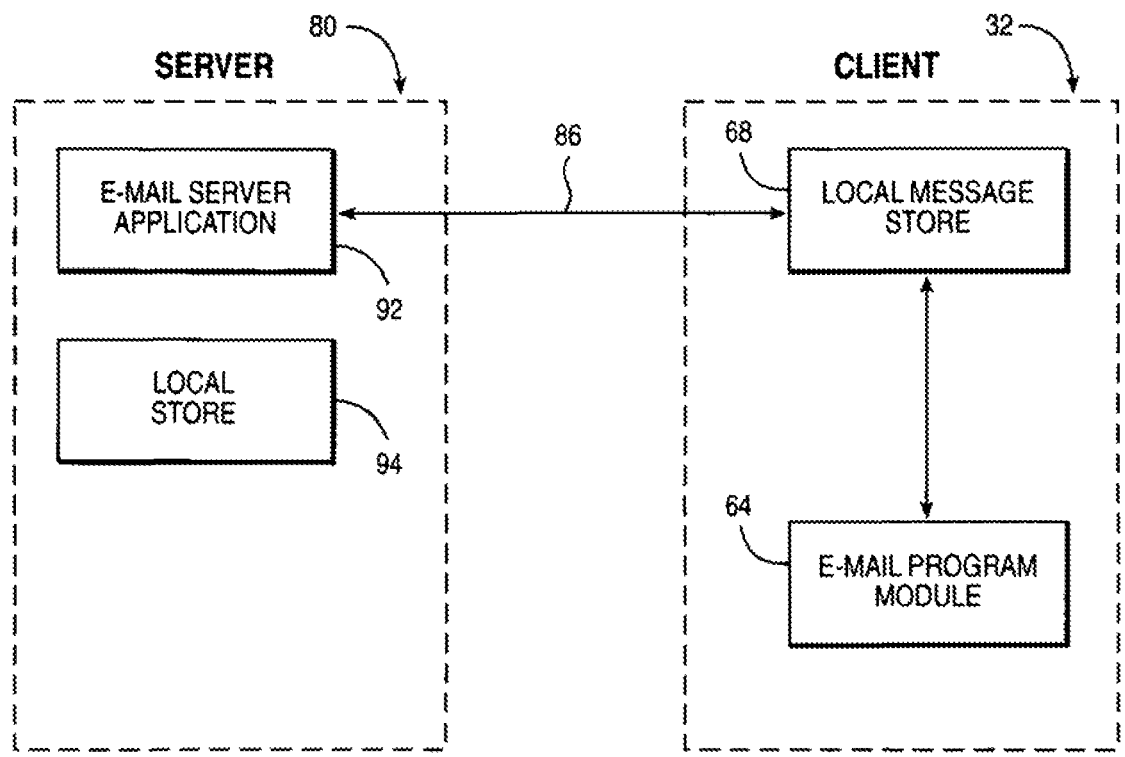
FIG. 3 is a diagram of exemplary components used in the present invention.

FIG. 3 is a diagram of some of the components in an exemplary client and server. The server 80 houses any e-mail messages from clients in the local store 94 while awaiting transmission to an appropriate destination. The server stores Web content associated with embedded hyperlinks either in the local store with each message or a data housing means such as a database. The e-mail server application 92 forwards messages over the WAN 86 from a sender client (not shown) to the client 32, upon request by the client 32. When a request for a message is made by the client 32 to the server 80, the e-mail server application 92 on the server 80 responds by retrieving the message from the local store 94 on the server 80 and by transmitting the message over the WAN 86 to the client 32. The message is then downloaded into the local message store 68 located at the client 32. The local message store 68 houses all downloaded messages from the server 80.

Figure 4:
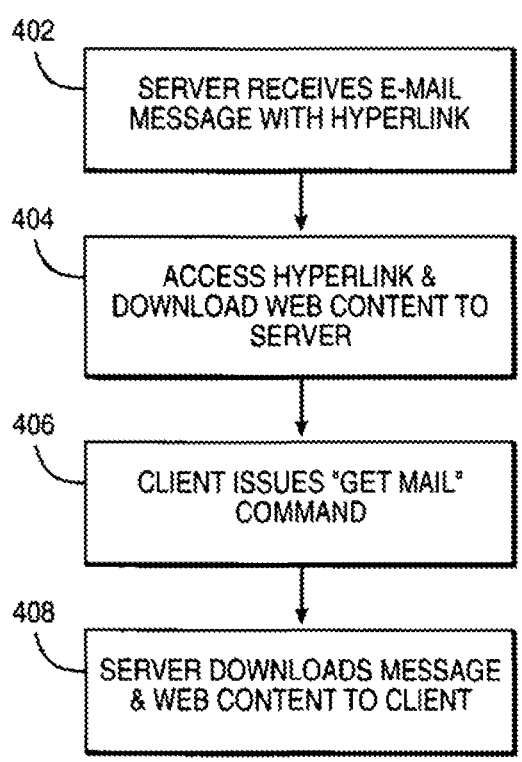
FIG. 4 is a flow diagram of an exemplary embodiment of the present invention.

FIG. 4 is a flow diagram of an exemplary embodiment of the present invention. A mail message containing an embedded hyperlink is received at the server, and Web content associated with the hyperlink is downloaded into the message store at the server, 404. Upon receipt of a "get mail" command from a client, 406 the mail message and the corresponding Web content are then transmitted for display at the client, 408. Alternatively, the client may set specific times for downloading e-mail messages containing Web content. The server would then hold the message until the designated time.

Figure 5:
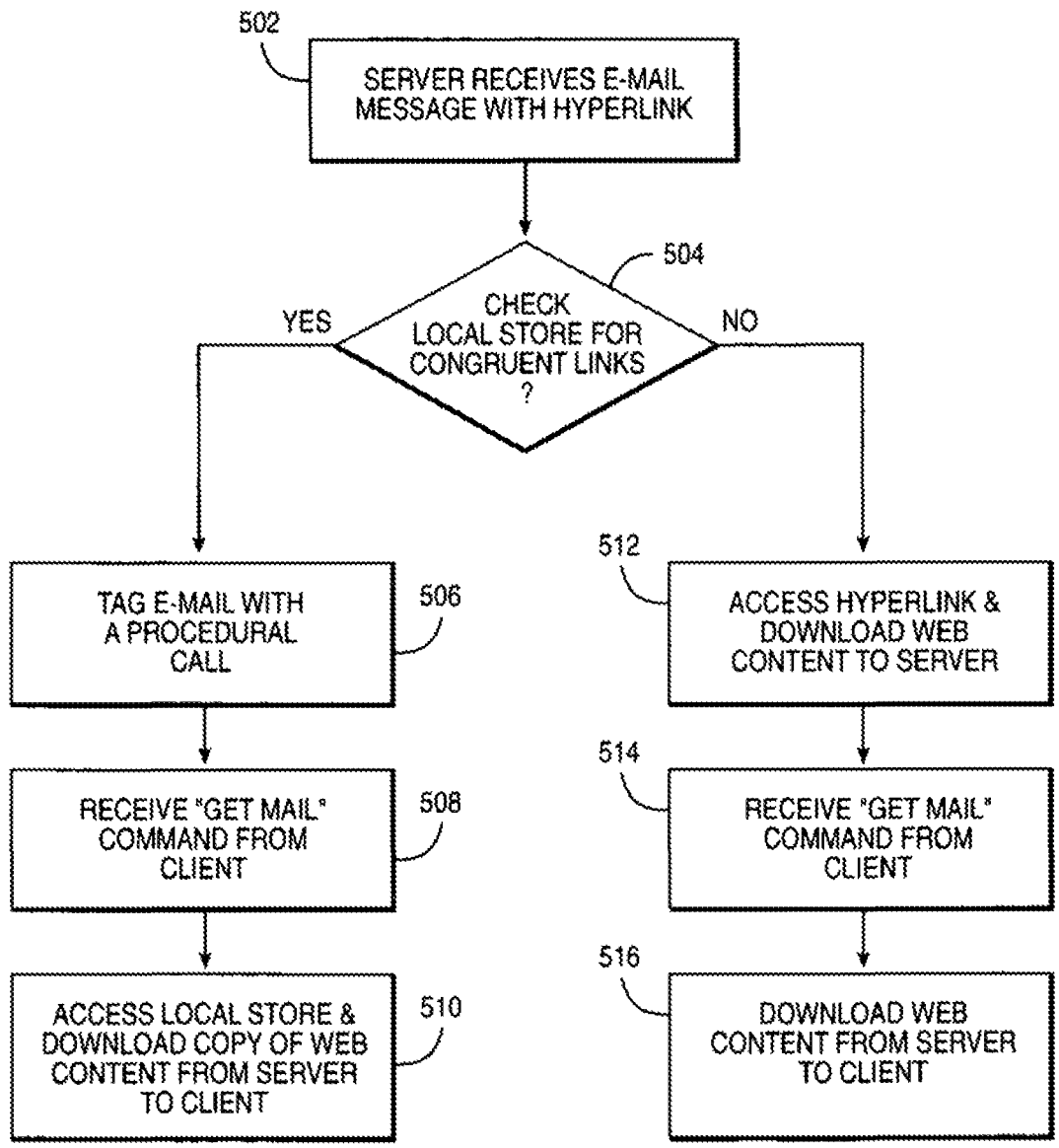
FIG. 5 is a flow diagram of another exemplary embodiment of the present invention.

FIG. 5 is a flow diagram of another exemplary embodiment of the present invention. The mail server receives the incoming mail message, 502 and scans the message for embedded links. The server then checks the local store for a congruent link, 504. If the server detects a plurality of incoming mail messages containing a common hyperlink, in its local store, each incoming mail message containing the common hyperlink is tagged with a procedural call, 506, which can be invoked upon download of the message via the client. When a request by the client is made to retrieve a message, 508, the procedural call is invoked and the message sent will contain either a link to the server, rather than to the Web site, or the entire Web content of the hyperlink source embedded and formatted within the e-mail document, 510. Accordingly, when a tagged message is retrieved by a client, the hyperlink is parsed and the proper content is sent to the client from the message content store.

Where the hyperlink is unique, the Web content is downloaded to the server, 512 as in FIG. 4. When the client requests their mail from the server, 514, the server downloads the Web content to the client, 516.

If the Web content is large, the server may contain instructions to compress the content until it is delivered to the client. Commercially available compression techniques such as zip, arg, tar, and the like, may be used to compress the content. The compressed content can automatically be decompressed on the client side seamlessly without requiring user input. The decompression can be performed by currently available client side mail programs such as Microsoft Outlook and Lotus Notes.

In addition, the client may specify when the client wants to receive messages containing hyperlinks. The mail server determines that the client has set a time for downloading messages containing Web content and stores the message and the content until the designated download period expires. A document manager in conjunction with the local message store can receive the data from the mail server and store it at the client until the client checks their mail. For example, the client could specify a time when the client is not using their computer or in the evening hours. Specifying a download time is useful in that it allows the messages to be downloaded during off peak usage times when bandwidth is more abundant.

Although certain preferred embodiments have been shown and described, it will be understood that many changes and modifications may be made therein without departing from the scope and intent of the appended claims.

What is claimed is:

1. In a distributed computer system including a server and a client, the server including a message store, a method for delivering Web content within a body section of electronic mail messages comprising:
   receiving at a server, at least one mail message containing an embedded hyperlink;
   downloading Web content associated with the hyperlink into the message store at the server;
   transmitting the mail message and at least one of a link to the Web content downloaded into the message store at the server and the corresponding Web content for display at the client;
   determining whether the client has a preset time for downloading messages containing Web content; and
   in response to determining that a preset time for downloading Web content exists, caching the message and Web content at the server until the preset time is reached.

2. The method of claim 1, wherein the transmitting of the mail message and at least one of a link to the Web content downloaded into the message store at the server and the corresponding Web content for display at the client comprises transmitting the mail message and the corresponding Web content for display at the client.

3. The method of claim 1 further comprising:
   detecting, at the server, a plurality of incoming mail messages containing a common hyperlink;
   tagging each incoming mail message containing the common hyperlink;
   storing one copy of the Web content associated with the common hyperlink in the message store at the server; and
   parsing the hyperlink when a tagged message is sent to the client.

4. The method of claim 1 further comprising:
   determining whether the Web content exceeds a predetermined size; and
   in response to determining that the Web content exceeds a predetermined size,
   compressing the Web content that exceeds the predetermined size, at the server.

5. The method of claim 1, wherein the preset time comprises a time of off peak usage of the client.

6. The method of claim 1, wherein the transmitting of the mail message and at least one of a link to the Web content downloaded into the message store at the server and the corresponding Web content for display at the client comprises transmitting the mail message and the corresponding Web content for display at the client, wherein the method comprises:
   detecting, at the server, a plurality of incoming mail messages containing a common hyperlink;

tagging each incoming mail message containing the common hyperlink;
storing one copy of the Web content associated with the common hyperlink in the message store at the server; and
parsing the hyperlink when a tagged message is sent to the client.

7. The method of claim 6, wherein the preset time comprises a time when bandwidth for downloading Web content to the client is greater relative to other times.

8. A server for delivering Web content within a body section of electronic mail messages to a client, the server comprising:
a computer readable medium;
a processor communicatively coupled to the computer readable medium;
a module, executable on the processor, the module configured to,
receive at a server, at least one mail message containing an embedded hyperlink;
download Web content associated with the hyperlink into the message store at the server;
transmit the mail message and at least one of a link to the Web content downloaded into the message store at the server and the corresponding Web content for display at the client;
determine whether the client has a preset time for downloading messages containing Web content; and
in response to determination that a preset time for downloading Web content exists, cache the message and Web content at the server until the preset time is reached.

9. The server of claim 8, wherein as part of the transmit of the mail message and at least one of a link to the Web content downloaded into the message store at the server and the corresponding Web content for display at the client, the module is configured to transmit the mail message and the corresponding Web content for display at the client.

10. The server of claim 8, wherein the module is configured to:
detect, at the server, a plurality of incoming mail messages containing a common hyperlink;
tag each incoming mail message containing the common hyperlink;
store one copy of the Web content associated with the common hyperlink in the message store at the server; and
parse the hyperlink when a tagged message is sent to the client.

11. The server of claim 8, wherein the module is configured to:
determine whether the Web content exceeds a predetermined size; and
in response to determination that the Web content exceeds a predetermined size,
compress the Web content that exceeds the predetermined size, at the server.

12. The server of claim 8, wherein the preset time comprises a time of off peak usage of the client.

13. The server of claim 8, wherein as part of the transmit of the mail message and at least one of a link to the Web content downloaded into the message store at the server and the corresponding Web content for display at the client, the module is configured to transmit the mail message and the corresponding Web content for display at the client, wherein the module is configured to:
detect, at the server, a plurality of incoming mail messages containing a common hyperlink;
tag each incoming mail message containing the common hyperlink;
store one copy of the Web content associated with the common hyperlink in the message store at the server; and
parse the hyperlink when a tagged message is sent to the client.

14. The server of claim 8, wherein the preset time comprises a time when bandwidth for downloading Web content to the client is greater relative to other times.

15. A computer program product for delivering Web content within a body section of electronic mail messages, the computer program product comprising:
a non-transitory computer readable storage medium having computer usable program code embodied therewith, the computer usable program code comprising a computer usable program code configured to:
receive at a server, at least one mail message containing an embedded hyperlink;
download Web content associated with the hyperlink into the message store at the server;
transmit the mail message and at least one of a link to the Web content downloaded into the message store at the server and the corresponding Web content for display at the client;
determine whether the client has a preset time for downloading messages containing Web content; and
in response to determination that a preset time for downloading Web content exists, cache the message and Web content at the server until the preset time is reached.

16. The computer program product of claim 15, wherein as part of the transmit of the mail message and at least one of a link to the Web content downloaded into the message store at the server and the corresponding Web content for display at the client, the computer usable program code is configured to transmit the mail message and the corresponding Web content for display at the client.

17. The computer program product of claim 15, wherein the computer usable program code is configured to:
detect, at the server, a plurality of incoming mail messages containing a common hyperlink;
tag each incoming mail message containing the common hyperlink;
store one copy of the Web content associated with the common hyperlink in the message store at the server; and
parse the hyperlink when a tagged message is sent to the client.

18. The computer program product of claim 15, wherein the computer usable program code is configured to:
determine whether the Web content exceeds a predetermined size; and
in response to determination that the Web content exceeds a predetermined size,
compress the Web content that exceeds the predetermined size, at the server.

19. The computer program product of claim 15, wherein the preset time comprises a time of off peak usage of the client.

20. The computer program product of claim 15, wherein as part of the transmit of the mail message and at least one of a link to the Web content downloaded into the message store at the server and the corresponding Web content for display at the client, the computer usable program code is configured to transmit the mail message and the corresponding Web content for display at the client, wherein the module is configured to:
- detect, at the server, a plurality of incoming mail messages containing a common hyperlink;
- tag each incoming mail message containing the common hyperlink;
- store one copy of the Web content associated with the common hyperlink in the message store at the server; and
- parse the hyperlink when a tagged message is sent to the client.

* * * * *